United States Patent
Fujita (10) Patent No.: US 8,619,225 B2
(45) Date of Patent: Dec. 31, 2013

(54) LIQUID CRYSTAL DEVICE WITH PIXEL ELECTRODE UNDER THE COMMON ELECTRODE AND THINNER THAN DRAIN ELECTRODE, METHOD OF MANUFACTURING LIQUID CRYSTAL DEVICE, AND ELECTRONIC APPARATUS

(75) Inventor: Shin Fujita, Suwa (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 503 days.

(21) Appl. No.: 12/003,020

(22) Filed: Dec. 19, 2007

(65) Prior Publication Data

US 2008/0239223 A1    Oct. 2, 2008

(30) Foreign Application Priority Data

Mar. 28, 2007  (JP) ................................ 2007-083647
Aug. 7, 2007   (JP) ................................ 2007-205035

(51) Int. Cl.
    *G02F 1/1343*    (2006.01)
(52) U.S. Cl.
    USPC ........................... 349/141; 349/142; 349/144
(58) Field of Classification Search
    USPC ......................................................... 349/141
    See application file for complete search history.

(56) References Cited

U.S. PATENT DOCUMENTS

| | | | |
|---|---|---|---|
| 5,805,247 A * | 9/1998 | Oh-e et al. | 349/42 |
| 6,055,034 A * | 4/2000 | Zhang et al. | 349/151 |
| 6,100,947 A * | 8/2000 | Katayama | 349/38 |
| 6,485,997 B2 | 11/2002 | Lee et al. | |
| 6,630,977 B1 * | 10/2003 | Yamazaki et al. | 349/141 |
| 6,645,576 B2 | 11/2003 | Iwakabe et al. | |
| 6,646,707 B2 | 11/2003 | Noh et al. | |
| 6,816,222 B2 | 11/2004 | Ono et al. | |
| 7,012,665 B2 | 3/2006 | Asai et al. | |
| 7,136,130 B2 | 11/2006 | Ono et al. | |
| 7,256,843 B2 | 8/2007 | Iwakabe et al. | |

(Continued)

FOREIGN PATENT DOCUMENTS

CN   1881053      12/2006
JP   2001-001441  1/2001

(Continued)

OTHER PUBLICATIONS

Japanese Office Action dated Jun. 14, 2011 for corresponding Application No. 2007-205035.

(Continued)

*Primary Examiner* — Hoan C Nguyen
(74) *Attorney, Agent, or Firm* — K&L Gates LLP (57) ABSTRACT

A liquid crystal device, which has a plurality of pixels and switching elements provided in correspondence with the pixels, includes an element substrate, an interlayer insulating film, a first electrode layer, and a second electrode layer. The switching elements are formed in the element substrate. The interlayer insulating film is formed on the switching elements. The first electrode layer is formed on the interlayer insulating film. The second electrode layer is formed in the element substrate and overlaps the first electrode in plan view through an interelectrode insulating film. Each of the pixels includes a first region and a second region. The first electrode layer overlaps the second electrode layer in plan view in the first region. Of the first electrode layer and the second electrode layer, only the first electrode layer is formed in the second region. The thickness of the second electrode layer is smaller than the thickness of the first electrode layer.

11 Claims, 7 Drawing Sheets

(56) References Cited

U.S. PATENT DOCUMENTS

| | | |
|---|---|---|
| 7,295,268 B2 | 11/2007 | Ono et al. |
| 7,465,594 B2 | 12/2008 | Konno |
| 7,518,667 B2 | 4/2009 | Asai et al. |
| 7,538,829 B2 | 5/2009 | Iwakabe et al. |
| 2001/0043304 A1* | 11/2001 | Matsumoto .................. 349/141 |
| 2004/0141135 A1* | 7/2004 | Maeda et al. ................. 349/143 |
| 2006/0007380 A1* | 1/2006 | Yamazaki et al. ............ 349/141 |
| 2006/0061719 A1 | 3/2006 | Tomioka et al. |
| 2006/0146243 A1* | 7/2006 | Nakanishi et al. ........... 349/139 |
| 2007/0013773 A1 | 1/2007 | Tsuchiya et al. |
| 2007/0171319 A1 | 7/2007 | Fujita et al. |

FOREIGN PATENT DOCUMENTS

| | | |
|---|---|---|
| JP | 2001-126538 | 5/2001 |
| JP | A 2001-235763 | 8/2001 |
| JP | A 2002-182230 | 6/2002 |
| JP | 2003-131248 | 5/2003 |
| JP | A-2003-131248 | 5/2003 |
| JP | 2005-268062 | 9/2005 |
| JP | 2006-276581 | 10/2006 |
| JP | 2006-350059 | 12/2006 |
| JP | A-2006-350059 | 12/2006 |
| JP | 2007-011037 | 1/2007 |
| JP | A-2007-11037 | 1/2007 |
| KR | 2001-0112586 A | 12/2001 |
| KR | 2002-0063498 A | 8/2002 |
| KR | 2003-0066386 A | 8/2003 |
| KR | 10-2007-0009475 A | 1/2007 |
| TW | 200424640 | 11/2004 |

OTHER PUBLICATIONS

Japanese Office Action issued Feb. 15, 2011, for corresponding Japanese Appln. No. 2007-205035.

Japanese Office Action for corresponding JP2007-205035 issued on Sep. 14, 2010.

Taiwanese Office Action issued Jul. 19, 2013 in corresponding Taiwanese Patent Application.

* cited by examiner

LIQUID CRYSTAL DEVICE WITH PIXEL ELECTRODE UNDER THE COMMON ELECTRODE AND THINNER THAN DRAIN ELECTRODE, METHOD OF MANUFACTURING LIQUID CRYSTAL DEVICE, AND ELECTRONIC APPARATUS

BACKGROUND

1. Technical Field

The present invention relates to a liquid crystal device and, more particularly, to a technology suitably applied to a liquid crystal device, typically, a so-called fringe field switching (hereinafter, referred to as FFS) mode liquid crystal device, in which both pixel electrodes and a common electrode are provided in an element substrate. In addition, the invention also relates to a method of manufacturing the liquid crystal device and to an electronic apparatus to which the liquid crystal device is applied.

2. Related Art

Among various liquid crystal devices, an FFS mode liquid crystal device is configured so that, between an element substrate and an opposite substrate, pixel electrodes, an interelectrode insulating film and a common electrode having openings formed therein are laminated in the element substrate, and liquid crystal is driven through an electric field applied between the pixel electrodes and the common electrode, which is described in Japanese Unexamined Patent Application Publication No. 2001-235763.

In the above FFS mode liquid crystal device, when bottom-gate thin-film transistors, which employ an amorphous silicon film, are used as pixel switching elements, and pixel electrodes are formed so as to directly overlap the drain electrodes of the thin-film transistors, the pixel electrodes are formed in the interlayer in which data lines are formed. Therefore, it is necessary to space the pixel electrodes apart from the data lines and, hence, there is a problem that an area for forming the pixel electrodes is small.

Figure 7A:
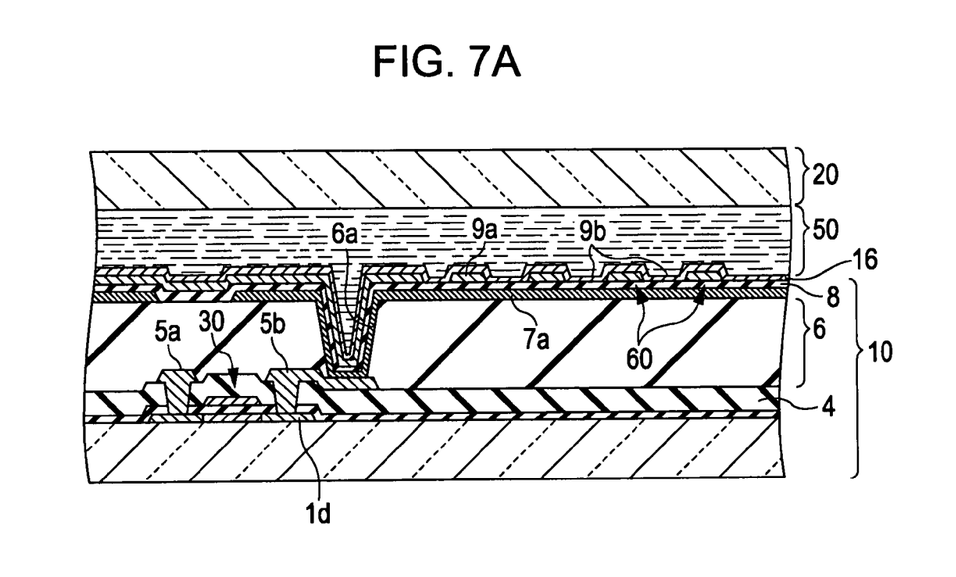
FIG. 7A is a cross-sectional view of one pixel of a liquid crystal device according to a known art.

Then, it has been proposed that, as shown in FIG. 7A, an interlayer insulating film 6 is formed so as to cover a thin-film transistor 30, which serves as a pixel switching element, and a pixel electrode 7a is electrically connected through a contact hole 6a of the interlayer insulating film 6 and a drain electrode 5b to a drain region 1d of the thin-film transistor 30. An example shown in FIG. 7A is provided in order to make comparison with the aspects of the invention. In the example, in the upper side layer of the pixel electrode 7a, an interelectrode insulating film 8, a common electrode 9a in which slit-like openings 9b are formed, and an alignment layer 16 are sequentially formed. The pixel electrode 7a and the common electrode 9a both are formed of ITO (indium tin oxide) films having the same thickness of 100 nm to 200 nm. With this configuration, the pixel electrode 7a may be formed up to a position in proximity to a data line 5a, and it is advantageous in that the area for forming the pixel electrode 7a may be increased.

Figure 7B:
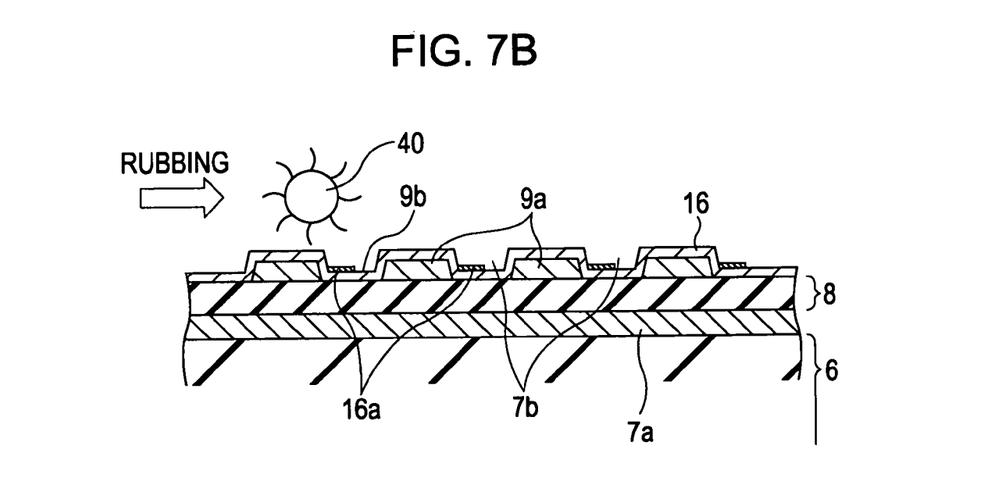
FIG. 7B is a schematic view that shows a state where a rubbing process is performed when the liquid crystal device is manufactured.

When a liquid crystal device is manufactured using the above configured element substrate 10, as shown in FIG. 7B, after the alignment layer 16 formed of polyimide resin is formed on the surface side of the common electrode 9a, a rubbing process, in which the surface of the alignment layer 16 is rubbed by using a rubbing roller 40, or the like, is performed. Thus, the alignment of liquid crystal molecules in a state where no electric field is applied is controlled. In order to perform the rubbing process uniformly over the entire surface of the alignment layer 16, the surface of the alignment layer 16 is preferably even, so that an organic planarizing film is preferably used for the interlayer insulating film 6.

However, when the rubbing process is performed in the configuration shown in FIG. 7A and FIG. 7B, in a direction in which the rubbing roller travels relative to the common electrode 9a, rubbing defects 16a problematically occur inside the openings 9b of the common electrode 9a over a wide area because of large steps due to the thickness of the common electrode 9a. The rubbing defects 16a cause a decrease in quality of display image, such as a decrease in contrast. On the other hand, when the thickness of the common electrode 9 and the thickness of the pixel electrode 7a are reduced, the electrical resistance of the common electrode 9a is increased. The increase in the electrical resistance causes generation of luminance non-uniformity, or the like, in an image.

In addition to the above rubbing defects, when the thickness of the common electrode 9a is large, there is a possibility that alignment defect occurs due to steps themselves or the contrast of display decreases due to variation in thickness of a liquid crystal layer in a pixel between an area in which the common electrode 9a is formed and the slit-like openings 9b.

The above problems not only occur when the common electrode 9a is formed on the interelectrode insulating film 8 but also occur when the pixel electrodes 7a are formed on the interelectrode insulating film 8.

SUMMARY

An advantage of some aspects of the invention is that it provides a liquid crystal device that is able to suppress the occurrence of defective display due to the thickness of an electrode formed on the interelectrode insulating film 8 without increasing the electrical resistance of the electrode layer.

A first aspect of the invention provides a liquid crystal device. The liquid crystal device, which has a plurality of pixels and switching elements provided in correspondence with the pixels, includes an element substrate, an interlayer insulating film, a first electrode layer, and a second electrode layer. The switching elements are formed in the element substrate. The interlayer insulating film is formed on the switching elements. The first electrode layer is formed on the interlayer insulating film. The second electrode layer is formed in the element substrate and overlaps the first electrode in plan view through an interelectrode insulating film. Each of the pixels includes a first region and a second region. The first electrode layer overlaps the second electrode layer in plan view in the first region. Of the first electrode layer and the second electrode layer, only the first electrode layer is formed in the second region. The thickness of the second electrode layer is smaller than the thickness of the first electrode layer.

Then, the element substrate may be performed with an alignment process. As an example of the alignment process, after an alignment layer formed of polyimide resin, or the like, is formed on the second electrode layer, a rubbing process, in which the surface of the alignment layer is rubbed by using a rubbing roller, or the like, is performed. According to the aspect of the invention, a step is formed in the alignment layer at a boundary between the first region and the second region; however, because the thickness of the second electrode layer is set smaller than the thickness of the first electrode layer, a step resulting from the thickness of the second electrode layer is low in height. Thus, it is possible to prevent the occurrence of rubbing defects. In addition, even when the rubbing defects occur, an area of the rubbing defects is extremely small. Therefore, it is possible to prevent a decrease in contrast due to the rubbing defects.

The advantageous effects of the aspect of the invention are notable particularly when the above described rubbing process is performed; however, in another alignment process, such as, for example, a process in which light is irradiated obliquely to a photosensitive polymer film or an alignment process using an obliquely evaporated film, it is possible to reduce defective alignment of the liquid crystal by suppressing the step, which is formed on the element substrate, to a lower height.

According to the aspect of the invention, a balance in thickness between the first electrode layer and the second electrode layer is made appropriate, and both the thickness of the first electrode layer and the thickness of the second electrode layer are not merely reduced. Thus, the total electrical resistance of the first electrode layer and the second electrode layer never increases. Hence, luminance non-uniformity never occurs in an image. Therefore, according to the aspect of the invention, it is possible to display an image with high quality.

In the aspect of the invention, one of the first electrode layer and the second electrode layer may be pixel electrodes that are connected to the corresponding switching elements, and the other of the first electrode layer and the second electrode layer may be a common electrode that is formed over the plurality of pixels. Particularly, the first electrode layer may be the common electrode, and the second electrode layer may be the pixel electrodes. By increasing the thickness of the common electrode, the electrical resistance of the common electrode, of which an increase in electrical resistance tends to result in notable luminance non-uniformity, may be reduced, so that luminance non-uniformity never occurs in an image.

In the aspect of the invention, the second region may be formed of an opening or a slit, which is provided in the second electrode layer.

In the aspect of the invention, the interlayer insulating film may be a planarizing film that contains an organic material. With this configuration, because the surface of the alignment layer becomes even, it is possible to perform a rubbing process uniformly over the entire surface.

In the aspect of the invention, the resistivity of a material that forms the first electrode layer may be substantially equal to the resistivity of a material that forms the second electrode layer. In the aspect of the invention, the thickness of the second electrode layer is made small, and the thickness of the first electrode layer is made large. Thus, a step due to the thickness of the second electrode layer is reduced, and an increase in electrical resistance of the entire electrode layer is prevented. Accordingly, when the resistivity of the first electrode layer is approximate to the resistivity of the second electrode layer, the advantageous effects of the invention become notable. Furthermore, both the first electrode layer and the second electrode layer may be formed of the same material. Even when the first electrode layer and the second electrode layer are formed of different materials, when a difference in resistivity between the first electrode layer and the second electrode layer is equal to or below $5 \times 10E-4$ $\Omega \cdot cm$, adjustment of the thickness of electrode and electrical resistance according to the configuration of the aspect of the invention is effective. A specific combination of the first electrode layer and the second electrode layer may be selected from, for example, ITO, IZO, ZnO, $In_2O_3$—ZnO, or the like.

A second aspect of the invention provides a method of manufacturing a liquid crystal device that includes a plurality of pixels and switching elements provided in correspondence with the pixels. The method includes forming the switching elements in the element substrate, forming an interlayer insulating film on the switching elements, forming a first electrode layer on the interlayer insulating film, and forming a second electrode layer on the element substrate so as to overlap the first electrode in plan view through an interelectrode insulating film, wherein, when the second electrode layer is formed, an opening or a slit is formed in the second electrode layer, and wherein the second electrode layer is formed so that the thickness of the second electrode layer is smaller than the thickness of the first electrode layer.

The above method of manufacturing the liquid crystal device may further include forming an alignment layer on the second electrode, and performing a rubbing process on the alignment layer.

The liquid crystal device according to the aspect of the invention may be used as a display portion of an electronic apparatus, such as a mobile telephone or a mobile computer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described. Note that in the following description, for easily recognizing the correspondence between the configuration of the embodiment and the configuration shown in FIG. 7A and FIG. 7B, the components having the same function will be described by assigning the same reference numerals. In addition, in the drawings referred in the following description, to make it easier to recognize layers and components shown in the drawings, the scale of the layers and components are varied. Furthermore, color filters, or the like, are not shown in the drawing.

First Embodiment

General Configuration

Figure 1A:
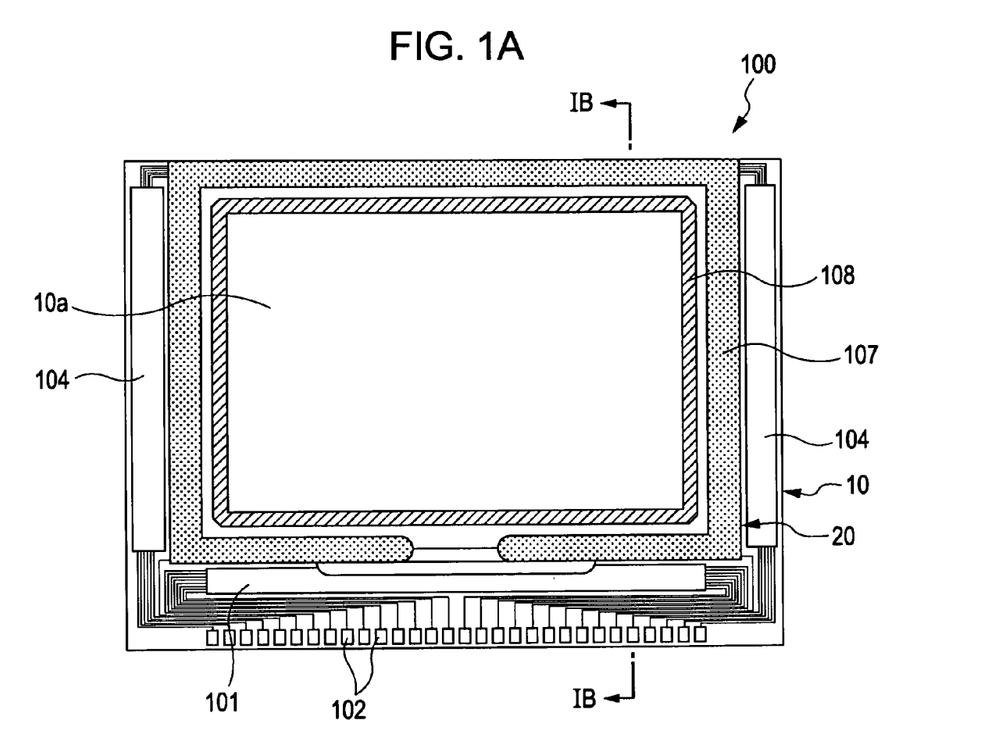
FIG. 1A is a plan view of a liquid crystal device with components formed therein as viewed from a side of an opposite substrate according to an embodiment of the invention.
Figure 1B:
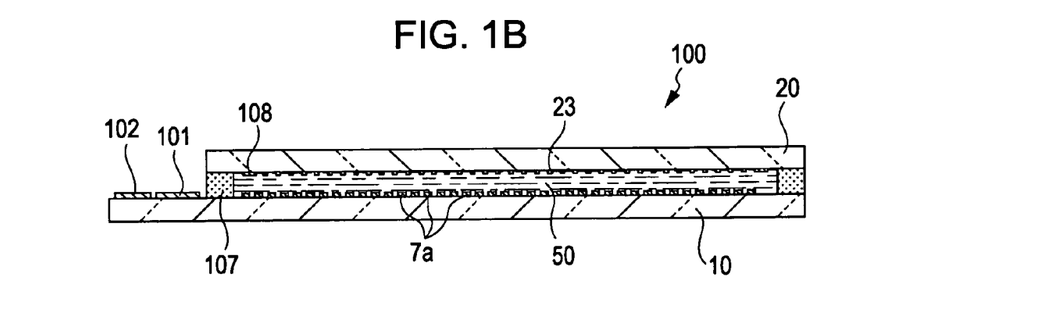
FIG. 1B is a cross-sectional view that is taken along the line IB-IB in FIG. 1A.

FIG. 1A is a plan view of a liquid crystal device with components formed therein as viewed from a side of an opposite substrate according to the embodiment of the invention. FIG. 1B is a cross-sectional view that is taken along the line IB-IB in FIG. 1A.

In FIG. 1A and FIG. 1B, the liquid crystal device 100 according to the present embodiment is a transmissive active matrix liquid crystal device. A seal material 107 is provided on an element substrate 10 along the periphery of an opposite substrate 20. In the element substrate 10, a data line driving circuit 101 and mounted terminals 102 are provided in an outer area of the seal material 107 along one side of the element substrate 10, and scanning line driving circuits 104 are formed along two sides that are adjacent to the side at which the mounted terminals 102 are arranged. Moreover, a peripheral circuit, such as a pre-charge circuit or a detection circuit, may be provided using the lower side of a window frame 108. The opposite substrate 20 has substantially the same outline as the seal material 107. By this seal material 107, the opposite substrate 20 is fixed to the element substrate 10. Then, liquid crystal 50 is held between the element substrate 10 and the opposite substrate 20.

Although it will be described in detail later, pixel electrodes 7a are formed in the element substrate 10 in a matrix. In contrast, the window frame 108, which is formed of a light shielding material, is formed in an area inside the seal material 107 in the opposite substrate 20, and the inside of the window frame 108 forms an image display area 10a. In the opposite substrate 20, a light shielding film 23, which is called a black matrix or a black stripe, is formed in an area that is opposite the vertical and horizontal boundary areas of the pixel electrodes 7a of the element substrate 10.

The liquid crystal device 100 according to the present embodiment drives the liquid crystal 50 in an FFS mode. Therefore, in the element substrate 10, a common electrode (not shown in FIG. 1B), which will be described later, is formed in addition to the pixel electrodes 7a, and no opposite electrode is formed in the opposite substrate 20.

Detailed Configuration of Liquid Crystal Device 100

Figure 2:
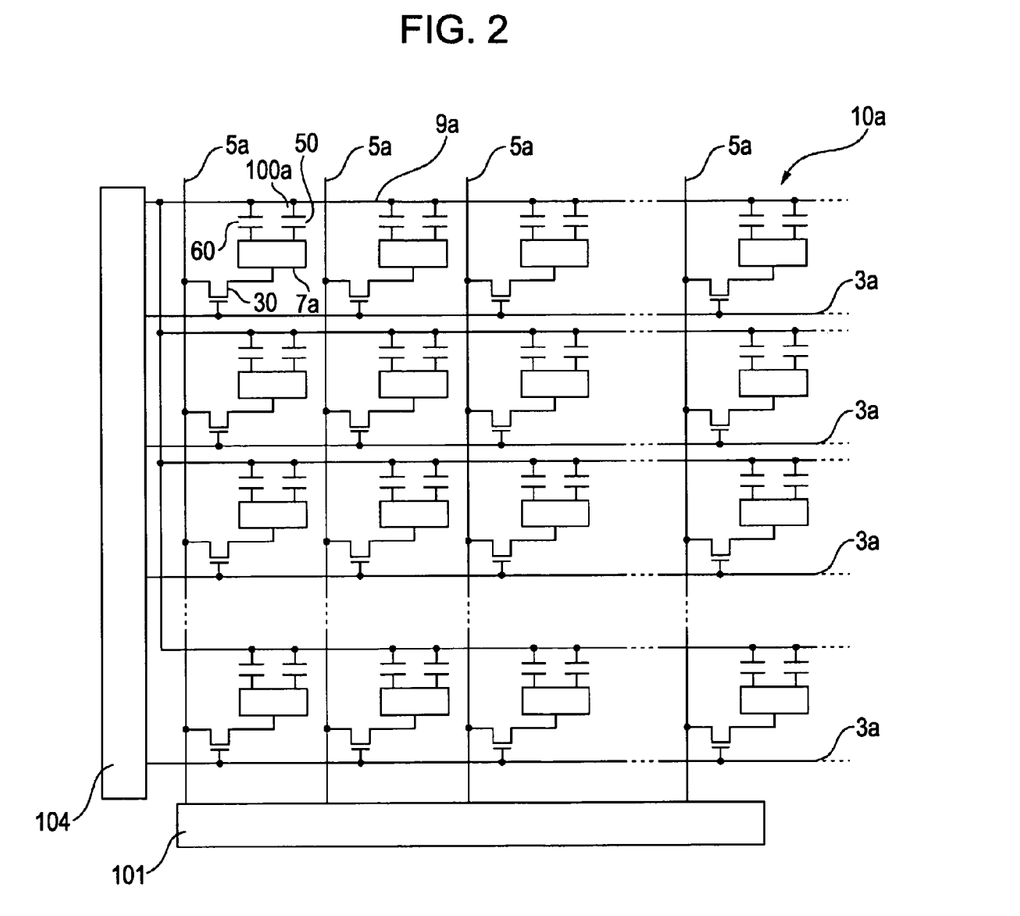
FIG. 2 is an equivalent circuit diagram that illustrates an electrical configuration of an image display area of an element substrate used in the liquid crystal device according to the embodiment of the invention.

The liquid crystal device 100 according to the embodiment of the invention and the configuration of the element substrate used in the liquid crystal device 100 will be described with reference to FIG. 2. FIG. 2 is an equivalent circuit diagram that illustrates an electrical configuration of the image display area 10a of the element substrate 10 used in the liquid crystal device 100 according to the embodiment of the invention.

As shown in FIG. 2, a plurality of pixels 100a are formed in a matrix in the image display area 10a of the liquid crystal device 100. Each of the plurality of pixels 100a includes a pixel electrode 7a and a thin-film transistor 30, which is used for pixel switching to control the pixel electrode 7a. Data lines 5a, which supply data signals (image signals) in line sequential, are electrically connected to the sources of the corresponding thin-film transistors 30. Scanning lines 3a are electrically connected to the gates of the corresponding thin-film transistors 30. The scanning lines 3a are configured to be applied with scanning signals at a predetermined timing in line sequential. Each of the pixel electrodes 7a is electrically connected to the drain of the corresponding thin-film transistor 30. Each pixel electrode 7a writes a data signal, which is supplied from the data line 5a, into the corresponding pixel 100a at a predetermined timing in such a manner that the thin-film transistor 30 is made to enter an on state only during a certain period. In this manner, a pixel signal of a predetermined level, written into the liquid crystal 50 shown in FIG. 1B through the pixel electrode 7a, is held with the corresponding common electrode 9a, which is formed in the element substrate 10, during a certain period. Here, a holding capacitance 60 is formed between the pixel electrode 7a and the common electrode 9a, and the voltage of the pixel electrode 7a is, for example, held during a period of time that is three digits longer than a period of time during which a source voltage is being applied. Thus, the charge holding characteristic is improved, and it is possible to realize the liquid crystal device 100 that is able to perform display with a high contrast ratio.

In FIG. 2, the common electrode 9a is shown as a wiring extending from the scanning line driving circuit 104; however, the common electrode 9a is formed over the substantially entire surface of the image display area 10a of the element substrate 10 and is held at a predetermined electric potential.

Detailed Configuration of Each Pixel

Figure 3A:
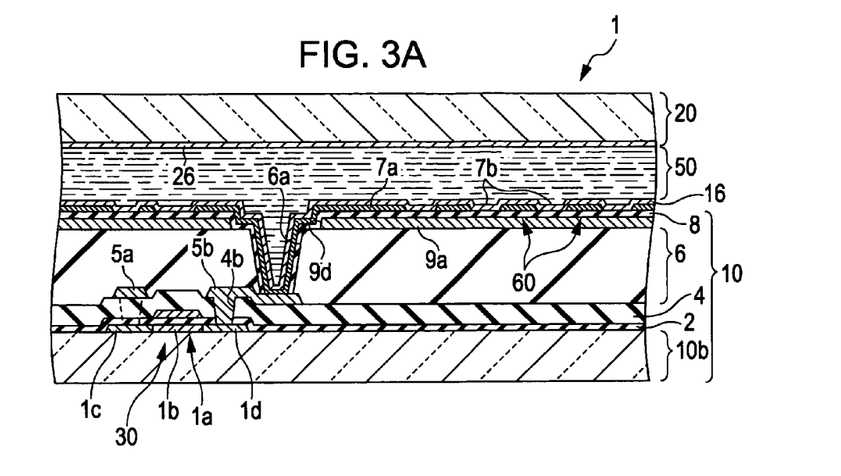
FIG. 3A is a cross-sectional view of one pixel of the liquid crystal device, taken along the line IIIA-IIIA in FIG. 3B, according to a first embodiment of the invention.
Figure 3B:
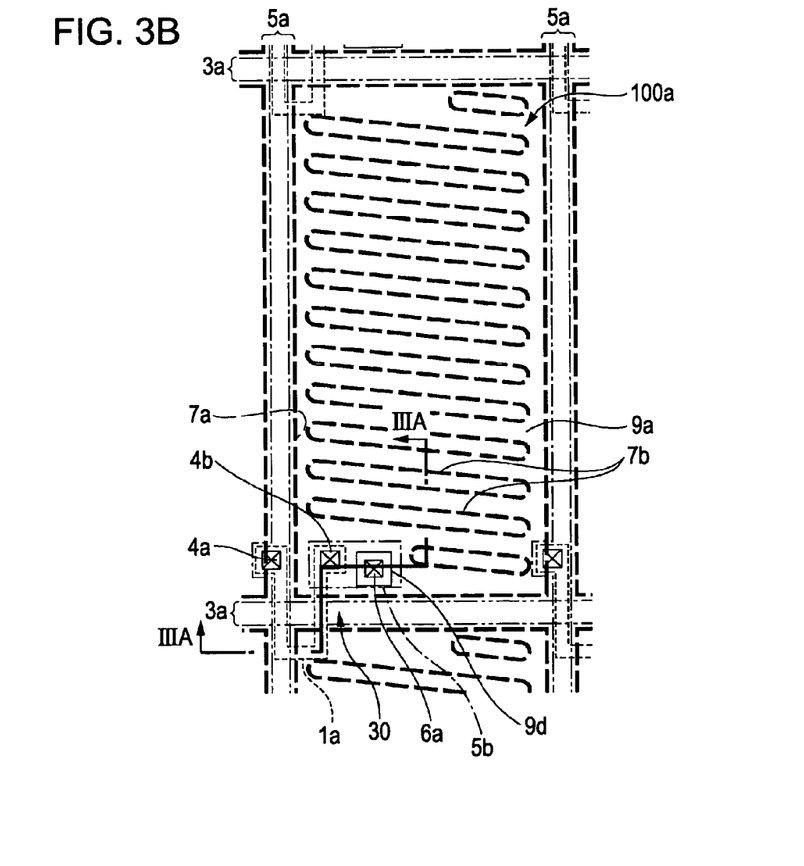
FIG. 3B is a plan view of the adjacent pixels in the element substrate according to the first embodiment of the invention.

FIG. 3A is a cross-sectional view of one pixel of the liquid crystal device 100 according to the embodiment of the invention. FIG. 3B is a plan view of the adjacent pixels in the element substrate 10 according to the embodiment of the invention. FIG. 3A is a cross-sectional view of the liquid crystal device 100, taken along the line IIIA-IIIA in FIG. 3B. On the other hand, in FIG. 3B, the pixel electrodes 7a are indicated by a long dotted line, the data lines 5a and the thin-films, which are formed at the same time with the data lines 5a, are indicated by an alternate long and short dash line, the scanning lines 3a are indicated by an alternate long and two short dashes line, and a partly removed portion in the common electrode 9a is indicated by a solid line. Note that, in FIG. 3A, in the opposite substrate 20, the light shielding film 23 and the color filter are not shown in the drawing.

As shown in FIG. 3A and FIG. 3B, the plurality of transparent pixel electrodes 7a (areas surrounded by a long dotted line) are formed in a matrix in the element substrate 10 at positions corresponding to the pixels 100a, and the data lines 5a (indicated by an alternate long and short dash line) and the scanning lines 3a (indicated by an alternate long and two short dashes line) are formed along the vertical and horizontal boundary areas between the adjacent pixel electrodes 7a. In addition, the common electrode 9a, which is formed of an ITO film, is formed over the substantially entire surface of the image display area 10a of the element substrate 10. In the present embodiment, the common electrode 9a is formed solid, while, on the other hand, each of the pixel electrodes 7a includes a plurality of slit-like openings 7b (indicated by a long dotted line) formed therein, and, in the openings 7b, the common electrode 9a does not overlap the pixel electrodes 7a. In the present embodiment, the plurality of openings 7b are formed so as to extend obliquely relative to a direction in which the scanning lines 3a extend, and the plurality of openings 7b extend parallel to each other.

The base body of the element substrate 10 shown in FIG. 3A is formed of a transparent substrate 10b, such as a quartz substrate or a heat resistant glass substrate. The base body of the opposite substrate 20 shown in FIG. 3A is formed of a transparent substrate 20b, such as a quartz substrate or a heat resistant glass substrate. In the present embodiment, both of the transparent substrates 10b, 20b are formed using a glass substrate. In the opposite substrate 20, an alignment layer 26 is formed over the entire surface thereof; however, unlike a TN mode liquid crystal device, no opposite electrode is formed.

Referring back to FIG. 3A and FIG. 3B, in the element substrate 10, a base protection film (not shown), which is formed of a silicon oxide film, or the like, is formed on the surface of the transparent substrate 10b, and, on the surface side, a top-gate type thin-film transistor 30 is formed at a position in proximity to the corresponding pixel electrode 7a. As shown in FIG. 3A and FIG. 3B, each of the thin-film transistors 30 has a structure such that a channel forming region 1b, a source region 1c and a drain region 1d are formed in an island-like semiconductor film 1a. The thin-film transistor 30 may be formed so as to include an LDD (Lightly Doped Drain) structure in which a lightly doped region is provided on both sides of the cannel forming region 1b. In the present embodiment, the semiconductor film 1a is a polysilicon film that is polycrystallized by laser annealing, lamp annealing, or the like, after an amorphous silicon film is formed on the element substrate 10.

A gate insulating film 2, which is formed of a silicon oxide film, silicon nitride film, or a laminated film of them, is formed in the upper side layer on the semiconductor film 1a, and part of the scanning line 3a overlaps in the upper side layer on the gate insulating film 2 as a gate electrode. In the present embodiment, the semiconductor film 1a is bent into a U shape and has a twin gate structure in which a gate electrode is formed at two portions in a channel direction of the semiconductor film 1a.

An interlayer insulating film 4, which is formed of a silicon oxide film, a silicon nitride film, or a laminated film of them, is formed in the upper side layer on the gate electrode (scanning line 3a). The data line 5a is formed on the surface of the interlayer insulating film 4. The data line 5a is electrically connected through a contact hole 4a, which is formed in the interlayer insulating film 4, to a source region located at a position closest to the data line 5a. Moreover, a drain electrode 5b is formed on the surface of the interlayer insulating film 4. The drain electrode 5b is a conductive film that is formed at the same time with the data line 5a. The drain electrode 5b is electrically connected to the drain region 1d through the contact hole 4b, which is formed in the interlayer insulating film 4.

An interlayer insulating film 6 is formed in the upper side layer on the data line 5a and on the drain electrode 5b. In the present embodiment, the interlayer insulating film 6 is formed as a planarizing film (organic planarizing film) that is formed of a thick photosensitive resin having a thickness of 1.5 μm to 2.0 μm.

The common electrode 9a, which is a lower layer side electrode layer, is formed of a solid ITO film over the entire surface of the interlayer insulating film 6. An interelectrode insulating film 8 is formed on the surface of the common electrode 9a. In the present embodiment, the interelectrode insulating film 8 is formed of a silicon oxide film or a silicon nitride film having a thickness of 400 nm or below.

The pixel electrodes 7a, which serve as an upper layer side electrode layer, are formed of an ITO film in the upper side layer on the interelectrode insulating film 8. An alignment layer 16 is formed on the surface side of the pixel electrodes 7a. The above described slit-like openings 7b are formed in each of the pixel electrodes 7a. In the above described configuration, the common electrode 9a and the pixel electrodes 7a are opposite each other through the interelectrode insulating film 8, and the holding capacitance 60 is formed using the interelectrode insulating film 8 as a dielectric film.

Here, the pixel electrode 7a is electrically connected to the drain electrode 5b through a contact hole 6a, which is formed in the interlayer insulating film 6. For this reason, the common electrode 9a has a rectangular cutout 9d, which is located at a portion at which the contact hole 6a is formed.

In the above configured liquid crystal device 100, the liquid crystal 50 is driven at the slit-like openings 7b and therearound by using a horizontal electric field formed between the pixel electrodes 7a and the common electrode 9a. Thus, it is possible to display an image.

Figure 4:
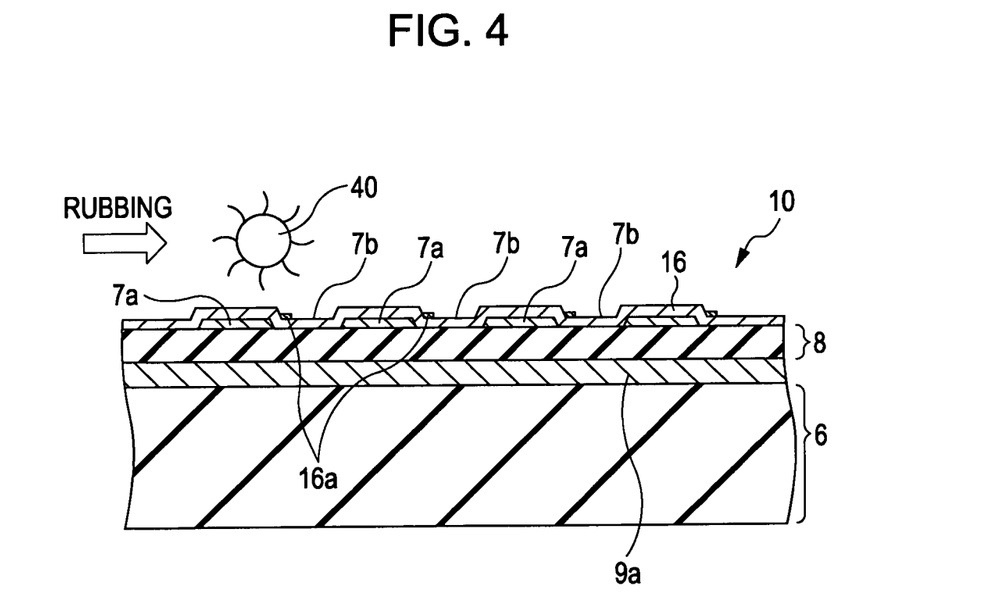
FIG. 4 is a schematic view that shows a state where a rubbing process is performed when the liquid crystal device according to the embodiment of the invention is manufactured.

Configuration of Electrode Layer and Advantageous Effects of the Present Embodiment When the liquid crystal device 100 is manufactured using the above configured element substrate 10, as shown in FIG. 4, after the alignment layer 16 formed of polyimide resin is formed on the surface side of the pixel electrodes 7a, a rubbing process, in which the surface of the alignment layer 16 is rubbed by using a rubbing roller 40, or the like, is performed. Thus, the alignment of liquid crystal molecules in a state where no electric field is applied is controlled. In order to perform the rubbing process uniformly over the entire surface of the alignment layer 16, the surface of the alignment layer 16 is preferably even, so that the organic planarizing film is used for the interlayer insulating film 6.

Here, the common electrode 9a, which serves as a lower layer side electrode layer, is formed as a solid electrode layer using an ITO film having a thickness of 50 nm to 200 nm. The pixel electrodes 7a, which serve as upper layer side electrode layer, are formed as an electrode layer having the slit-like openings 7b using an ITO film having a thickness of 30 nm to 100 nm. The relationship between the thickness of the common electrode 9a and the thickness of the pixel electrodes 7a is expressed as follows: the thickness of the pixel electrodes 7a (upper layer side electrode layer)<the thickness of the common electrode 9a (lower layer side electrode layer). That is, in comparison with the common electrode 9a that is formed solid, the thickness of the pixel electrodes 7a having the slit-like openings 7b formed therein is small.

Thus, when the rubbing process is performed, there is a possibility that, in a direction in which the rubbing roller travels relative to the pixel electrodes 7a, rubbing defects 16a occur inside the openings 7b of the pixel electrodes 7a at portions that are blocked by steps due to the thickness of the pixel electrodes 7a. However, in the present embodiment, the thickness of the pixel electrodes 7a, in which the slit-like openings 7b are formed, is small. Thus, even when the rubbing defects 16a occur, the rubbing defects 16a occur only in extremely narrow areas. Hence, no decrease in contrast, or the like, occurs, and it is possible to improve the quality of image displayed.

Furthermore, in the present embodiment, the thickness of the common electrode 9a is increased by amount by which the thickness of the pixel electrodes 7a is reduced. Thus, the electrical resistance of the pixel electrodes 7a and the common electrode 9a as a whole is maintained at a low level. Particularly, because the common electrode 9a is formed over the plurality of pixels, the electrical resistance tends to be problematic. However, in the present embodiment, because the thickness of the common electrode 9a is made large, the electrical resistance of the common electrode 9a is lower than that of the known art. Hence, it is possible to reliably prevent the occurrence of luminance non-uniformity in an image.

In the present embodiment, in order to prevent the occurrence of luminance non-uniformity in an image due to the reduced thickness of the pixel electrodes 7a, the thickness of the common electrode is increased and, thereby, the total electrical resistance of the pixel electrodes 7a and common electrode 9a is increased. In the present embodiment, the pixel electrode 7a and the common electrode 9a both are formed by using an ITO film. However, instead of ITO film, a transparent conductive film, such as IZO, may be used for the pixel electrode 7a and the common electrode 9a. Further, a conductive film used for the pixel electrode 7a and a conductive film used for the common electrode 9a may employ different materials. In this case, by selecting materials such that the absolute value of a difference in resistivity between the material used for the pixel electrode 7a and the material used for the common electrode 9a is equal to or below $5 \times 10E-4$ Ω·cm, the total value of electrical resistance is ideally adjusted. Thus, the configuration with "the thickness of pixel electrode 7a < the thickness of common electrode 9a" is achieved.

Second Embodiment

Figure 5A:
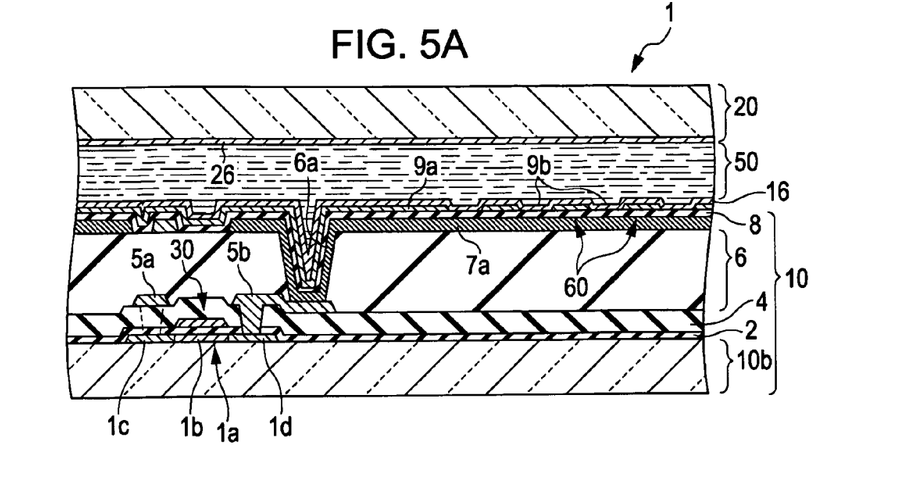
FIG. 5A is a cross-sectional view of one pixel of the liquid crystal device, taken along the line VA-VA in FIG. 5B, according to a second embodiment of the invention.
Figure 5B:
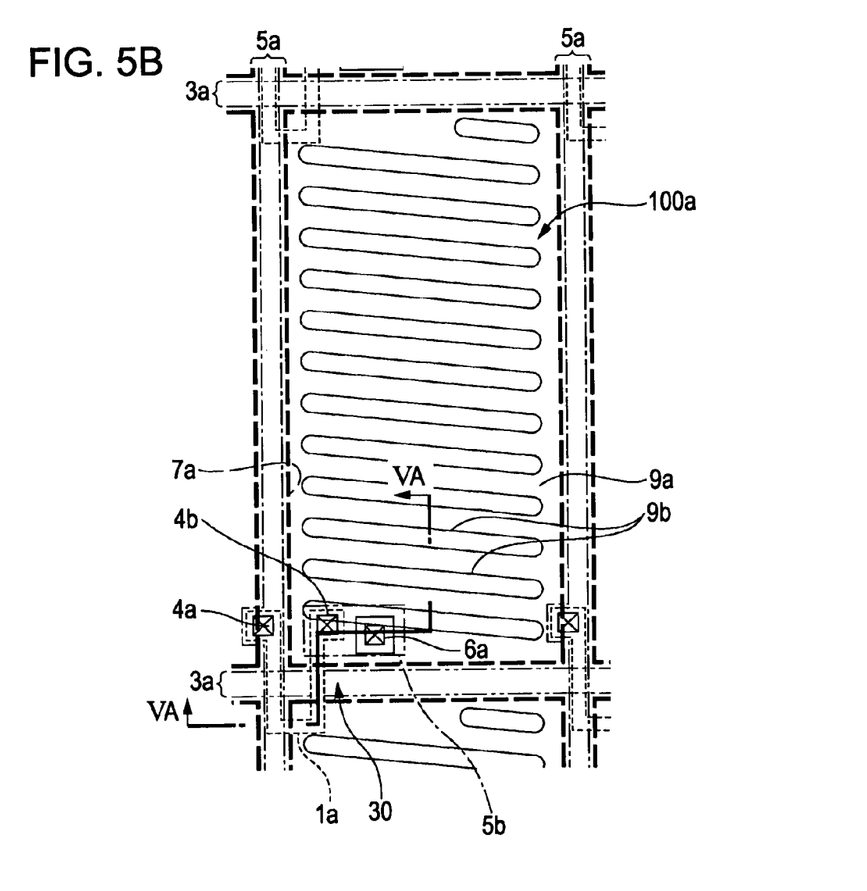
FIG. 5B is a plan view of the adjacent pixels in the element substrate according to the second embodiment of the invention.

FIG. 5A is a cross-sectional view of one pixel of the liquid crystal device 100 according to a second embodiment of the invention. FIG. 5B is a plan view of the adjacent pixels in the element substrate 10 according to the second embodiment of the invention. FIG. 5A is a cross-sectional view of the liquid crystal device 100, taken along the line VA-VA in FIG. 5B. Note that the basic configuration of the present embodiment is the same as that of the first embodiment, the same reference numerals are assigned to the common components, and a description thereof is omitted.

As shown in FIG. 5B, the plurality of transparent pixel electrodes 7a (areas surrounded by a long dotted line) are formed in a matrix in the element substrate 10 at positions corresponding to the pixels 100a, and the data lines 5a (indicated by an alternate long and short dash line) and the scanning lines 3a (indicated by an alternate long and two short dashes line) are formed along the vertical and horizontal boundary areas between the adjacent pixel electrodes 7a. In addition, the common electrode 9a, which is formed of an ITO film, is formed over the substantially entire surface of the image display area 10a of the element substrate 10. In the present embodiment, each of the pixel electrodes 7a are formed solid, while, on the other hand, the common electrode 9a includes slit-like openings 9b that are formed so as to extend obliquely relative to a direction in which the scanning lines 3a extend. The plurality of slit-like openings 9b extend parallel to each other.

As shown in FIG. 5A and FIG. 5B, in the element substrate 10, the upper layer side of the thin-film transistor 30 is covered with the interlayer insulating film 6 formed of an organic planarizing film, and the pixel electrode 7a, which serves as a lower layer side electrode layer, is formed solid using an ITO film on the surface of the interlayer insulating film 6. In addition, the interelectrode insulating film 8 is formed on the surface of the pixel electrode 7a.

The common electrode 9a, which serves as an upper layer side electrode layer, is formed using an ITO film in the upper side layer on the interelectrode insulating film 8. The common electrode 9a includes the above described slit-like openings 9b formed therein. In the slit-like openings 9b, the pixel electrodes 7a do not overlap the common electrode 9a. In each of the pixels, the percentage of the slit-like openings 9b ranges from 20% to 60%.

When the liquid crystal device 100 is manufactured using the above configured element substrate 10, as in the case of the configuration described with reference to FIG. 4, after the alignment layer 16 formed of polyimide resin is formed on the surface side of the common electrode 9a, the rubbing process, in which the surface of the alignment layer 16 is rubbed by using the rubbing roller 40, or the like, is performed. Thus, the alignment of liquid crystal molecules in a state where no electric field is applied is controlled. In order to perform the rubbing process uniformly over the entire surface of the alignment layer 16, the surface of the alignment layer 16 is preferably even, so that the organic planarizing film is used for the interlayer insulating film 6.

Here, the pixel electrodes 7a, which serve as a lower layer side electrode layer, are formed as a solid electrode layer using an ITO film having a thickness of 50 nm to 200 nm. The common electrode 9a, which serves as an upper layer side electrode layer, is formed as an electrode layer having the slit-like openings 9b using an ITO film having a thickness of 30 nm to 100 nm. The relationship between the thickness of the common electrode 9a and the thickness of the pixel electrodes 7a is expressed as follows: the thickness of the common electrode 9a (upper layer side electrode layer) < the thickness of the pixel electrodes 7a (lower layer side electrode layer). That is, in comparison with the pixel electrodes 7a that are formed solid, the thickness of the common electrode 9a having the slit-like openings 9b formed therein is small.

Thus, when the rubbing process is performed, there is a possibility that, in a direction in which the rubbing roller travels relative to the common electrode 9a, rubbing defects 16a occur inside the slit-like openings 9b of the common electrode 9a at steps due to the thickness of the common electrode 9a. However, in the present embodiment, the thickness of the common electrode 9a, in which the slit-like openings 9b are formed, is small. Thus, even when the rubbing defects 16a occur, the rubbing defects 16a occur only in extremely narrow areas. Hence, no decrease in contrast, or the like, occurs, and it is possible to improve the quality of image displayed.

Furthermore, in the present embodiment, the thickness of the pixel electrodes 7a is increased by amount by which the thickness of the common electrode 9a is reduced. Thus, the electrical resistance of the pixel electrodes 7a and the common electrode 9a as a whole is maintained at a low level.

In the present embodiment, in order to prevent luminance non-uniformity of an image due to the reduced thickness of the common electrode 9a, the thickness of the pixel electrodes is increased and, thereby, the total electrical resistance of the pixel electrodes 7a and common electrode 9a is increased. In the present embodiment, the pixel electrode 7a and the common electrode 9a both are formed by using an ITO film. However, instead of ITO film, a transparent conductive film, such as IZO, may be used for the pixel electrode 7a and the common electrode 9a. Further, a conductive film used for the pixel electrode 7a and a conductive film used for the common electrode 9a may employ different materials. In this case, by selecting materials such that the absolute value of a difference in resistivity between the material used for the pixel electrode 7a and the material used for the common electrode 9a is equal to or below $5 \times 10E-4$ Ω·cm, the total value of electrical resistance is ideally adjusted. Thus, the configuration with "the thickness of pixel electrodes 7a > the thickness of common electrode 9a" is achieved.

Other Embodiments

Note that, in the first and second embodiments, slit-like spaced portions are formed so as to form the openings; however, the aspects of the invention may be applied to a liquid crystal device in which an opening is formed so that each of the pixel electrodes is formed into a comb shape or a fishbone shape.

In addition, a polysilicon film is used as a semiconductor film in the first and second embodiments; however, the invention may be applied to the element substrate 10 that uses an amorphous silicon film or a monocrystal silicon layer. Moreover, the invention may also be applied to a liquid crystal device that uses a thin-film diode element (nonlinear element) as a pixel switching element.

Application Example to Electronic Apparatus

Figure 6A:
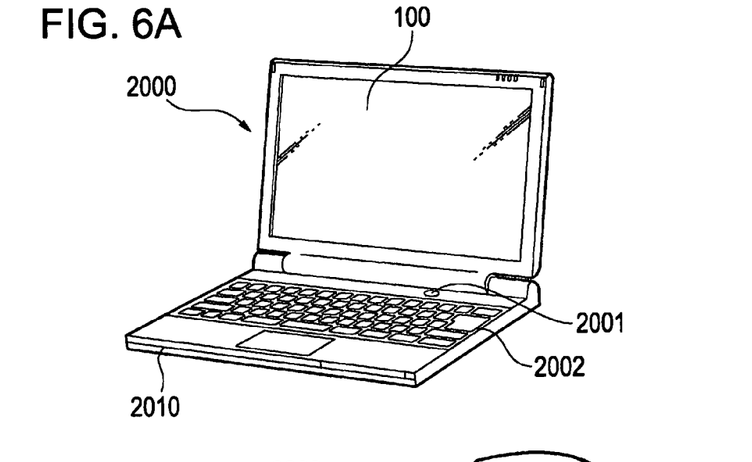
FIG. 6A to FIG. 6C are views illustrating electronic apparatuses that use the liquid crystal device according to the embodiment of the invention.
Figure 6B:
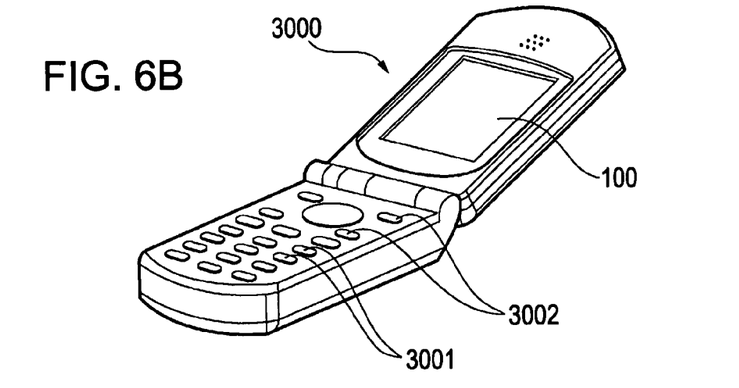
Figure 6C:
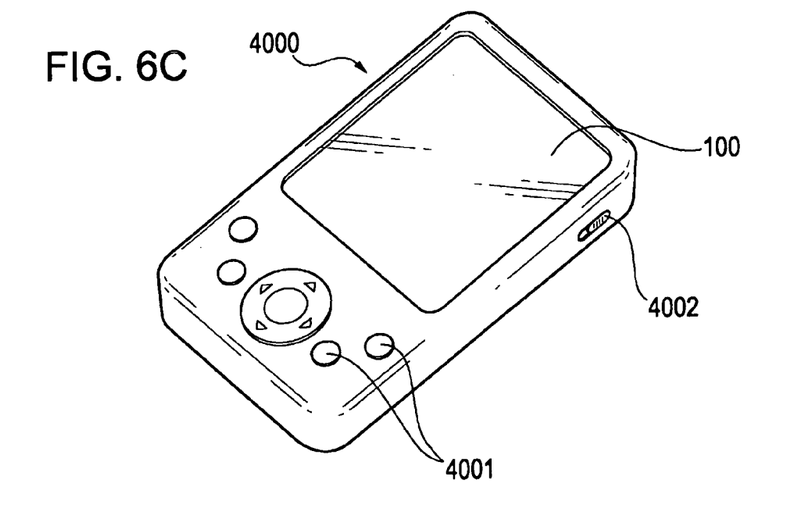

An electronic apparatus to which the above described liquid crystal device 100 is applied will now be described. FIG. 6A is a view that shows a configuration of a mobile personal computer provided with the liquid crystal device 100. The personal computer 2000 includes the liquid crystal device 100, which serves as a display unit, and a main body portion 2010. The main body portion 2010 is provided with a power switch 2001 and a keyboard 2002. FIG. 6B is a view that shows a configuration of a mobile telephone that is provided with the liquid crystal device 100. The mobile telephone 3000 includes a plurality of operation buttons 3001, a plurality of scroll buttons 3002, and the liquid crystal device 100, which serves as a display unit. By manipulating the scroll buttons 3002, an image displayed on the liquid crystal device 100 is scrolled. FIG. 6C is a view that shows a configuration of a personal digital assistant (PDA) that uses the liquid crystal device 100. The portable information terminal 4000 includes a plurality of operation buttons 4001, a power switch 4002, and the liquid crystal device 100, which serves as a display unit. As the power switch 4002 is manipulated, various pieces of information, such as an address book and a schedule book, are displayed on the liquid crystal device 100.

Note that the electronic apparatuses that use the liquid crystal device 100 include, in addition to the apparatuses shown in FIG. 6A to FIG. 6C, a digital still camera, a liquid crystal display television, a viewfinder type or a direct view type video tape recorder, a car navigation system, a pager, a personal organizer, an electronic calculator, a word processor, a workstation, a video telephone, a point-of-sales terminal, and devices provided with a touch panel display. Then, as a display portion for these various electronic apparatuses, the above described liquid crystal device 100 may be applied.

The entire disclosure of Japanese Patent Application Nos 2007-083647 filed Mar. 28, 2007 and 2007-205035 filed Aug. 7, 2007 are expressly incorporated by reference herein.

What is claimed is:

1. A transmission type liquid crystal display device, which includes a plurality of pixels and switching elements provided in correspondence with the pixels, the liquid crystal display device comprising:
an element substrate in which the switching elements are formed, each switching element including a drain electrode;
an interlayer insulating film that is formed on the switching elements and has a thickness ranging from 1.5 to 2 µm;
a first electrode layer that is formed on the interlayer insulating film and connected to the drain electrode; and
a second electrode layer that overlaps the first electrode in plan view through an interelectrode insulating film, the element substrate having the second electrode, wherein:
each of the pixels includes a first region and a second region,
the first electrode layer is between the interlayer insulating film and the second electrode layer,
the first electrode layer overlaps the second electrode layer in plan view in the first region,
of the first electrode layer and the second electrode layer, only the first electrode layer is formed in the second region,
the first electrode layer has a thickness of 50 nm to 200 nm, the second electrode layer has a thickness of 30 nm to 100 nm, and the interelectrode insulating film has a thickness of less than 0.4 µm,
the thickness of the second electrode layer is smaller than the thickness of the first electrode layer, and
the thickness of the first electrode layer is less than the thickness of the drain electrode.

2. The transmission type liquid crystal display device according to claim 1, wherein the element substrate is performed with an alignment process.

3. The transmission type liquid crystal display device according to claim 2, wherein an alignment layer is formed on the second electrode layer, and wherein a step is formed in the alignment layer at a boundary between the first region and the second region.

4. The transmission type liquid crystal display device according to claim 1, wherein one of the first electrode layer and the second electrode layer is pixel electrodes that are connected to the corresponding switching elements, and the other of the first electrode layer and the second electrode layer is a common electrode that is formed over the plurality of pixels.

5. The transmission type liquid crystal display device according to claim 4, wherein the first electrode layer is the common electrode, and the second electrode layer is the pixel electrodes.

6. The transmission type liquid crystal display device according to claim 1, wherein the second region is formed of an opening or a slit, which is provided in the second electrode layer.

7. The transmission type liquid crystal display device according to claim 1, wherein the interlayer insulating film is a planarizing film that contains an organic material.

8. The transmission type liquid crystal display device according to claim 1, wherein a difference in resistivity between the first electrode layer and the second electrode layer is equal to or below 5×10E−4 Ω·cm.

9. An electronic apparatus comprising the transmission type liquid crystal display device according to claim 1.

10. The transmission type liquid crystal display device according to claim 1, wherein the second electrode layer has a plurality of openings that are formed so as to extend obliquely relative to a direction in which scanning lines extend, and the plurality of openings extend parallel to each other.

11. The transmission type liquid crystal display device according to claim 1, wherein the first electrode layer has a cutout, and the second electrode layer has a plurality of openings that are located on one side of the cutout.

* * * * *